Jan. 30, 1940.     H. F. BAUER ET AL     2,188,329
GUMMED TAPE MANUFACTURE
Filed Dec. 22, 1938
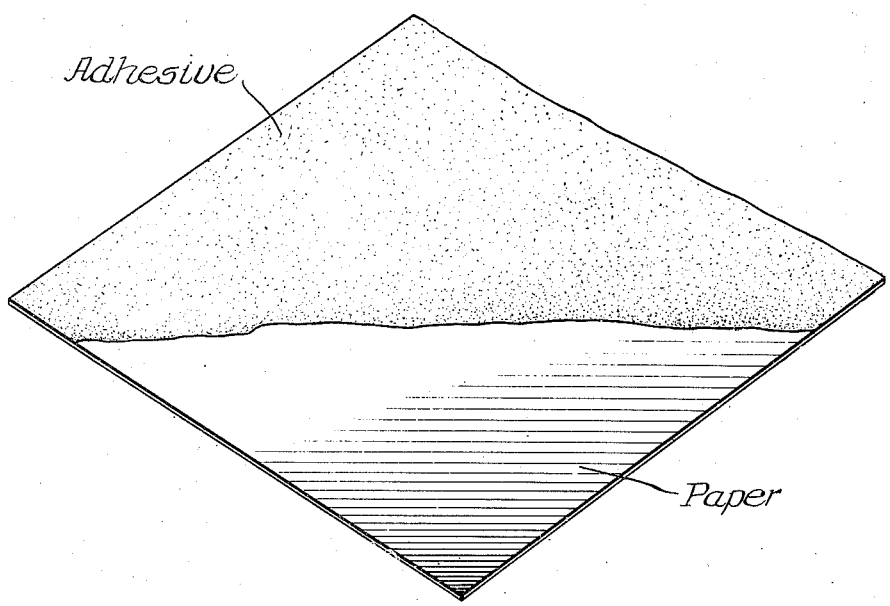
Inventors:
Hans F. Bauer,
Jordan V. Bauer,
Don M. Hawley,
BY
ATTORNEY.

Patented Jan. 30, 1940

2,188,329

UNITED STATES PATENT OFFICE 2,188,329

GUMMED TAPE MANUFACTURE

Hans F. Bauer, Chicago, Jordan V. Bauer, Elmwood Park, and Don M. Hawley, Geneva, Ill., assignors to Stein, Hall Manufacturing Company, Chicago, Ill., a corporation of Delaware Application December 22, 1938, Serial No. 247,138

12 Claims. (Cl. 91—68)

This invention relates to improvements in gummed tape manufacture and more particularly to a new and improved type of remoistening tape and to a new and improved method for the manufacture thereof.

In our copending application, Serial No. 226,074, filed August 22, 1938, now Patent No. 2,144,610, we have described a new and improved type of remoistening tape containing an amylaceous adhesive. The term "amylaceous adhesive" is employed to refer to those types of adhesives which are prepared from starches and starch degradation products such as dextrines and starch gums. The expression "remoistening tape containing an amylaceous adhesive" is employed to describe paper or fabric, or combinations of paper and fabric, in the form of a strip containing on one side thereof an adhesive which, on being moistened, will immediately develop tackiness and act as a suitable adhesive for bonding the paper or fabric to other materials.

At present large amounts of gummed paper suitable for such purposes as labels, stamps and envelope seals are prepared with dextrine adhesive, but dextrine adhesives have never been successful in replacing animal glue adhesives in the field of gummed tape for sealing the heavier types of boxes or for gummed paper or fabric which is to be used for purposes wherein it is required that the adhesive coating on being remoistened will develop immediately strong adhesive properties and set up very rapidly to form a bond. In our application previously referred to we have described a new and improved type of gummed tape containing an adhesive made from a base material of certain specified characteristics. This tape affords many improvements and advantages over the animal glue type of tape and possesses adhesive properties which are superior to those of most of the animal glue tapes now in use. It can be employed in those uses where heretofore only gummed tape made from animal glue or fish glue remoistening adhesives could be satisfactorily used. The base material from which this tape is made may be described as an incompletely dextrinized starch or British gum converted to a solubility of at least about 70% in water at 75° F. and a dextrine content of less than 55%, as determined by the method of Babington, Tingle and Watson. See "The examination of commercial dextrine and related starches," Babington, Tingle and Watson, Journal of the Society of Chemical Industry, 37 (1918) 257.

One of the objects of this invention is to provide a new and improved type of gummed tape containing a different type of vegetable remoistening adhesive than heretofore employed and characterized by such exceptional adhesive strength that the tape is suitable for the strongest types of adhesive applications. Other objects will appear hereinafter.

We have found in accordance with this invention that we are able to prepare superior remoistening tapes which develop extreme tackiness immediately on being remoistened, do not tend to slip or slide on the surface to which they are applied even under conditions of considerable tension or sidewise pressure and have sufficient cohesiveness while still wet to hold surfaces together which would normally tend to spring apart. This is accomplished by the use of a specified type of base material for the remoistening adhesive in conjunction with certain auxiliary materials as hereinafter more fully described.

In our copending application previously referred to we have employed for gummed tape manufacture a base material having a dextrine content of less than 55% as determined by the Babington, Tingle and Watson test and a relatively high solubility. In accordance with the present invention we have found that we may use amylaceous base materials of certain specified types having certain specified fluidities and a relatively low water solubility provided said materials are utilized in conjunction with auxiliary materials as more fully hereinafter described.

The accompanying drawing pictures the adhesive coated sheet.

Our base materials for the purpose of the present invention are derived from root starches, as, for example, sago, sweet potato, tapioca and potato, which have been converted to the following characteristics:

(a) A dextrine content of less than 55%, as determined by the Babington, Tingle and Watson test. The following method of determining dextrine content is the method of Babington, Tingle and Watson, as described in the Journal of the Society of Chemical Industry, supra:

"The sample (1 grm.) is warmed in a 100 cc. graduated flask with 30 cc. of water until just gelatinized and cooled quickly; 50 cc. of a cold saturated barium hydroxide solution is next added (the flask being meanwhile shaken), followed by enough water to bring the total volume to 100 cc. The solution is filtered through a dry 15 cm. paper and an aliquot portion (50 cc.) of the filtrate pipetted into a platinum dish. After the addition of 2 drops of 1% phenolphthalein solution, N/1 hydrochloric acid is added cautiously till the neutral point is just passed. A faint pink color is then restored by the addition of two or three drops of the barium hydroxide solution. A weighed quantity (about 10 grms.) of sand is added and the dish is heated on a water bath. The sand should be stirred when almost dry to expose the maximum surface to the air, after which the dish is transferred to a well regulated oven and dried to constant weight at 120° C., below which temperature crystallized barium chloride is dehydrated. Dextrin gum being hygroscopic, precautions must be taken accordingly. The dish is now heated strongly, but not beyond the temperature necessary for the complete combustion of the organic matter. During ignition the sand should be well stirred at intervals to allow full exposure to the air. The dish and contents are then cooled and weighed. The difference in weight before and after ignition represents the dextrin gum in 50 cc. of filtrate, i. e., in half the weight of sample taken."

(b) The viscosity of degraded or dextrinized starches is a definite indication of the extent to which the starch has been dextrinized or degraded. We use a range of viscosity specifications to further define the type of dextrinized starch product which is suitable for our purpose, and we find that a dextrinized or degraded starch to be satisfactory for our purposes should, when cooked in proportions of one part of degraded starch to one and one-half (1½) parts water to 190° F. and then cooled to 125° F. giving a viscosity reading within the range of fifteen (15) seconds to four hundred (400) seconds, preferably within the range of twenty-five (25) seconds to one hundred and fifty (150) seconds on the Stormer viscosity apparatus, the readings in question being the time for one hundred (100) revolutions of the viscosimeter cylinder using a one hundred gram (100 grm.) weight. The Stormer viscosimeter used gave a reading of 5.6 seconds with water at 125° F. and a reading of 2.4 seconds running free with the viscosimeter cup emptied, these readings being the time required at 100 revolutions of the viscosimeter cylinder, using a one hundred gram (100 grm.) weight.

The Babington, Tingle and Watson test specification of less than 55% dextrine content as given under (a) defines approximately the greatest degree to which the starch may be dextrinized or degraded and still be satisfactory for our purpose, whereas, the upper limit of 400 seconds Stormer viscosity at 125° F. defines approximately the lowest degree to which the starch may be degraded or dextrinized and yet be satisfactory for our purpose.

(c) Within the limits given under (a) and (b) we may employ conversion products derived from root starches having a solubility within the range of about 3% to about 50% in water at 75° F.

It should be understood that degraded or dextrinized starches somewhat outside the ranges we specify may, when used in the manner we disclose, function as remoistening adhesives. The limits given above, however, approximately define the range of amylaceous materials which we have found most suitable for this purpose.

It is known in the adhesive art that incompletely dextrinized starches give stronger and tougher adhesive films than those types of dextrine products which have been more completely dextrinized. Prior to our invention it has not been possible, however, for the purpose of remoistening tapes to take full advantage of these desirable properties of sols prepared from incompletely dextrinized starches, probably due to the tendency of the more incompletely degraded portions of these materials to retrograde to a less soluble state, which when in the form of a dried film will not remoisten with sufficient rapidity to be suitable for those usages to which remoistening adhesives are applied. We have found, however, that by the use of an amylaceous base material within the solubility range and dextrine content above specified in conjunction with certain additional materials which apparently function as a solvent for the more incompletely degraded portions of the amylaceous base material and counteract the retrogradation of these portions to a less soluble form it is possible to prepare remoistening adhesives that have superior adhesive properties and yet remoisten with the extreme rapidity that is necessary for gummed tape applications. Among the materials which have this solvent action are urea, thiourea, ammonium nitrate, sodium nitrate, guanidine nitrate, potassium nitrate, potassium thiocyanate, and sodium thiocyanate. These materials also apparently act as plasticizing agents, tending to inhibit the formation of checks or cracks and they may be used in preparing gummed tape in accordance with our invention with or without additional plasticizing agents, as, for example, glycerine, ethylene glycol, diethylene glycol and other polyhydric alcohols, or with sodium lactate and other substances having a plasticizing action. In general, we prefer to employ about 3% to about 30% of a solvent plasticizer of the character previously described, with or without about 1% to about 10% of a non-solvent plasticizer such as glycerine, polyhydric alcohols or other plasticizers. Of the solvent plasticizers previously mentioned, we prefer to employ water soluble ureas because of the unusually good results, the fact that they are non-toxic and are substantially neutral. Excellent results may be obtained, however, with the other solvent plasticizers mentioned.

The term "a water soluble urea" is employed herein to cover generically urea and its water soluble analogues and homologues, including thiourea. The expression "a water soluble thiocyanate" is used herein to cover the thiocyanates mentioned and other water soluble thiocyanates. The term "a water soluble nitrate" is used herein to cover the nitrates mentioned and other water soluble nitrates.

In addition to a solvent plasticizing agent, as previously described, we also include in our remoistening adhesives a relatively small amount of borax, or other similar material which is adapted to increase the tackiness and viscosity of amylaceous dispersions. To supplement the value of our gummed tape prepared in the manner herein described, we may add borax and various other materials such as alkalis, wetting agents, solvents and the like to the remoistening water. Sodium aluminate and similar soluble aluminates function somewhat similarly to borax in increasing the viscosity of amylaceous dispersions. We may also form our viscosity increasing agent in situ in the adhesive composition, for example, by incorporating in the adhesive boric acid and adding an alkali in the remoistening water, or some other compound adapted to react with boric acid to form a soluble borate. Thus, if boric acid is incorporated into the remoistening adhesive, a small amount of caustic alkali may be included in the moistening water to form sodium borate in situ.

It is well known to the adhesive art that the addition of borax to dextrine or starch gum adhesives increases their tackiness and viscosity. Because of this fact, a greater percentage of the dextrine and starch gum adhesives used today wherein the adhesive is applied in liquid or paste form and allowed to dry in situ between the surfaces to be bonded contain borax or mixtures of borax with other alkaline materials. It has not been practical, however, to use borax in those types of dextrine or starch gum adhesives which are used for remoistening purposes due to the fact that when films of dextrine or starch gum adhesive containing borax are dried they do not develop sufficient tackiness or adhesiveness rapidly enough on being remoistened to be suitable for such purposes as those to which gummed papers or fabrics are applied.

We have discovered that borax and other viscosity increasing agents may be used with the starchier types of amylaceous conversion products and may be added directly to the adhesive with a very decided improvement in remoistening characteristics provided a relatively small amount, as, for example, 1% to 10%, and preferably less than 5% is employed, and provided further that a modifying agent is used to modify the action of borax upon the starch. We have found that solvent plasticizers of the type previously mentioned, as well as glycerine, and other types of hydroxyl carrying plasticizers such as polyhydric alcohols have this modifying action and make the use of borax possible. For our purpose, however, we prefer that the plasticizing and modifying agent be present at least partially in the form of a normally solid solvent plasticizer of the type previously described rather than entirely in the form of a normally liquid relatively hygroscopic plasticizer such as glycerine, because the latter tends to destroy to some extent the adhesive and tackiness properties particularly when used in relatively large amounts.

We usually prefer that the amount of borax or other viscosity increasing agent be not greater than the amount of plasticizer. We have found, for example, that for the best results, where glycerine is used as a plasticizer, the amount of glycerine should be in excess of the amount of borax.

By the use of the specifically defined combination of materials we herein disclose we are able to produce a remoistening adhesive tape at least equivalent in adhesive properties to the better grades of animal glue remoistening adhesive tapes. Furthermore, by the use in conjunction with the above adhesive combination of the second, or supplementary means of our invention, namely, the introduction of borax or other viscosity increasing agent into the water used to remoisten the adhesive film, it is possible to obtain adhesive results far superior to animal glue remoistening adhesives.

We realize that the use of urea in conjunction with the more completely degraded dextrines and in certain instances with starches is not new. We believe, however, that our use of urea and other solvent plasticizers of the type defined in conjunction with a starch conversion product of the type herein defined is novel for the purpose of remoistening adhesive tape and produces new and improved results.

The unique results of our invention cannot be obtained by the mere use of urea in conjunction with any random type of degraded or dextrinized starch product. The prior art, to our knowledge, does not teach the value or use of urea and other solvent plasticizers with a starch degradation product within the range we define for the purpose of a superior remoistening adhesive tape.

The general type of remoistening tape covered by the present invention is illustrated in the accompanying drawing in which, as illustrated, an adhesive is applied as a coating to a paper strip. It will be understood that instead of a paper strip, a fabric strip may be employed, or alternatively, the strip may consist of a fabric backed paper strip in which the exposed surface of the paper contains an adhesive film. In general, the present invention is especially adapted to the manufacture of gummed tape in which the base material is a cellulosic sheet material such as paper.

We illustrate below several of our preferred adhesive formulae and a comparison of their adhesive properties with other types of remoistening adhesives as indicated by the McLaurin gummed tape tester. The adhesive samples were prepared in the manner specified and applied to kraft paper under uniform conditions equivalent to present commercial practice. The prepared samples of tape were then tested under uniform conditions on the McLaurin gummed tape tester, according to the method specified by the Thwing-Albert Instrument Company, Philadelphia, Pennsylvania, makers of the above instrument. It will be understood that the results of this test may vary somewhat depending upon humidity and temperature conditions, but the comparative results definitely showed the superiority of the gummed tape made in accordance with our invention.

The readings obtained with the better grades of animal glue tape run as an average between 65 and 90 when using the same test paper as was used in the examples below.

*Example I*

| | Parts |
|---|---|
| Tapioca conversion product | 97 |
| Borax | 3 |
| Urea | 20 |
| Water | 90 |
| Glycerine | 5 |

The above materials were mixed together and cooked to a temperature of 180° F. The mixture was then cooled to 80° F. and applied to the paper and dried. It may be applied either hot or cold. The tapioca conversion product used was one having a dextrine content of 9% as determined by the method of Babington, Tingle and Watson, a solubility of about 12.6% and a fluidity of 38 seconds, as determined on a Stormer viscosimeter in the manner previously described.

After being allowed to air dry for four days the McLaurin tests on this tape when moistened with water averaged about 79. A McLaurin test of 92 was obtained when the tape was moistened with a saturated solution of borax.

*Example II*

A composition was the same as that described in Example I except that the tapioca conversion product employed had a dextrine content of 20%, a solubility of 23% and a fluidity of 23 seconds. The mixture was prepared and applied to paper tape in the same manner as described in Example I.

After air drying four days the McLaurin test on tape prepared in this manner with this composition averaged about 85 when remoistened with water.

Example III

The composition was the same as that described in Example I except that the tapioca conversion product employed had a solubility of 25.4% and a dextrine content of 26% and a fluidity of about 18 to 20 seconds. The composition was prepared and applied to paper tape in the same manner as described in Example I.

After air drying four days the McLaurin test on tape prepared in this manner with this composition averaged about 82 when remoistened with water.

Example IV

| | Parts |
|---|---|
| Tapioca conversion product | 97 |
| Borax | 3 |
| Sodium nitrate | 20 |
| Water | 90 |
| Glycerine | 5 |

The above materials were mixed together and cooked to a temperature of about 180° F. The mixture was then cooled to 80° F. and applied to paper and dried. The tapioca conversion product was the same as that described in Example I, having a dextrine content of 9%, a solubility of about 12.6% and a fluidity of 38 seconds as determined on a Stormer viscosimeter in the manner previously described.

After being allowed to air dry for four days the McLaurin test on this tape when moistened with water averaged about 78. A higher test was obtained when the tape was moistened with a saturated solution of borax.

Example V

| | Parts |
|---|---|
| Tapioca conversion product | 100 |
| Urea | 25 |
| Borax | 3 |
| Water | 95 |
| Glycerine | 5 |

These ingredients were mixed together and cooked to a temperature of 180° F. The mixture was then cooled to 80° F. and applied to the paper and dried. The tapioca conversion product used was the same as that used in Example I.

After being allowed to air dry for four days the McLaurin tests on tape made in this manner averaged about 83.4. For comparison a similar tape was prepared except that borax was omitted from the composition. In this case a McLaurin test of only 28.8 was obtained. In this second tape the use of a saturated borax solution as the remoistening agent increased the McLaurin test to 50.1. The use of a saturated borax solution as the remoistening agent on the first tape increased the McLaurin test to 91.8. These results illustrate the importance of borax in the adhesive composition.

The following example is given to show the results obtained with corn conversion products as distinguished from tapioca conversion products, or conversion products made from other root starches:

Example VI

| | Parts |
|---|---|
| Corn conversion product | 100 |
| Urea | 25 |
| Borax | 3 |
| Water | 95 |
| Glycerine | 5 |

The above ingredients were cooked to about 180° F. then cooled to about 80° F. and applied to paper and dried.

The McLaurin tests on this tape averaged about 35.8 when moistened with plain water and about 57.4 when moistened with a saturated solution of borax. The corn conversion product employed in making this composition had a solubility of about 11.6%, a dextrine content of 10% and a fluidity of 43 seconds. This example illustrates, however, that the corn conversion products are inferior to tapioca conversion products, or conversion products obtained from other root starches, as distinguished from grain starches. On the other hand the compositions made from corn conversion products may be useful where a borax solution or a solution of another viscosity increasing agent is employed to remoisten the tape.

The following example is given to illustrate results obtained when the remoistening adhesive is prepared from an ordinary type of tapioca dextrine such as is now used in the art for preparing adhesives for stamps, labels and the like.

Example VII

| | Parts |
|---|---|
| Tapioca dextrine | 100 |
| Glycerine | 5 |
| Water | 70 |

The above materials were mixed together and cooked to a temperature of 190° F. then cooled to a temperature of 80° F. applied to paper tape and dried.

The tapioca dextrine was one having a solubility of 98% at 75° F. and a dextrine content as determined by the method of Babington, Tingle and Watson of 96%. The MaLaurin test on tape prepared with this adhesive composition averaged about 16 when moistened with water and about 29 when moistened with saturated borax solution.

Comparison of this example with Examples I to V indicates the importance of using an amylaceous base material of the type herein defined. It should be noted that by the use of our supplementary means of incorporating borax in the remoistening water, the adhesive properties of prior art types of adhesives can be substantially improved.

It should be understood that these various examples of adhesive formulae given above are for the purpose of illustrating the novel character of our invention and for the purpose of making clear the principle and the relative value of the means by which we obtain our result.

We, therefore, do not wish to be limited by the specific examples herein disclosed, inasmuch as numerous variations may be made in the character of the adhesive base and in the proportion of other ingredients used without departing from the limits we define as essential for the purposes of our invention.

Various plasticizing agents, wetting agents, solvents, anti-foaming agents and filling materials may be used in conjunction with our preferred adhesive means for the purpose of obtaining those special effects for which the use of such materials is known to the adhesive art. Small amounts of sulphonated oils, as, for example, Turkey red oil, in proportions of, say, 0.5% to about 3% may be included with our adhesive compositions. Among other things we have found that the McLaurin test in gummed tape made according to the present invention and also in accordance with that disclosed in our copending application Serial No. 226,074 may be greatly increased by the addition to the adhesive composition of small amounts of addition agents such as water soluble condensation products or resins. Among the additional agents which we have found to greatly increase the retacking properties and substantially increase the McLaurin test is a product made by Du Pont and sold in the trade as Rayon Size MW Mod. 90568. Water soluble substances of this type may be used in effective amounts, preferably up to around 5%, excellent results being obtained with as little as 1%, based on the weight of the adhesive composition.

In such instances where it is desirable our disclosed adhesive compositions may be mixed with compatible adhesive materials made from animal glue, fish glue, casein, starch, natural gums and water soluble natural or synthetic resins.

Gummed tape made in accordance with the present invention develops extreme tackiness immediately upon being remoistened and is characterized by a very high rapidity of set. As contrasted with animal glue tapes it has practically no odor. One of the further features of this tape resides in the fact that the adhesive contained thereon is substantially neutral and contains no ingredients which are harmful to paper or fabric or to the user in case the gummed tape is moistened with the tongue. Additionally, the adhesive film is extremely flexible and does not readily check, crack or chip off when the tape is flexed.

Having thus described the invention, what we claim as new and desire to secure by Letters Patent of the United States is:

1. A remoistening tape of the character described comprising a flexible cellulosic sheet material in the form of a dried coating thereon of a water pervious vegetable adhesive layer consisting mainly of a root starch conversion product converted to a solubility within the range of about 3% to about 50% in water at 75° F., a viscosity within the range of 15 seconds to 400 seconds, as determined in the manner herein described and a dextrine content less than about 55% as determined in the manner herein described, intimately dispersed with about 3% to about 30% urea based upon the weight of said conversion product, about 1% to about 5% borax and about 1% to about 10% glycerine, said adhesive possessing strong adhesive properties and being capable when moistened of developing tackiness and setting rapidly.

2. A remoistening tape of the character described comprising on at least one surface thereof a water pervious layer of adhesive consisting mainly of an incompletely dextrinized starch converted to a solubility of from about 3% to about 50% in water at 75° F., a viscosity within the range of about 15 seconds to about 400 seconds, as determined in the manner herein described, and a dextrine content less than about 55% as determined in the manner herein described, intimately dispersed with about 1% to about 10% of a soluble borate, a solvent plasticizing agent for said conversion product in effective amounts to inhibit the insolubilizing action of the borate on the conversion product.

3. A remoistening tape of the character described comprising on at least one surface thereof a water pervious layer of adhesive consisting mainly of a root starch conversion product converted to a solubility of from about 3% to about 50% in water at 75° F., a viscosity within the range of about 15 seconds to about 400 seconds, as determined in the manner herein described, and a dextrine content below about 55% as determined in the manner herein described, intimately dispersed with about 1% to about 10% of a soluble borate and about 3% to about 30% of a plasticizing agent.

4. A remoistening tape of the character described comprising on at least one surface thereof a water pervious layer of adhesive consisting mainly of a root starch converted to a solubility within the range of about 3% to about 50% in water at 75° F., a viscosity within the range of about 15 seconds to about 400 seconds, as determined in the manner herein described, and a dextrine content less than about 55% as determined in the manner herein described, intimately dispersed with about 1% to about 10% of a soluble borate and about 3% to about 30% of a plasticizing agent, the amount of plasticizing agent being greater than the amount of borate.

5. A remoistening tape of the character described comprising on at least one surface thereof a water pervious layer of adhesive consisting of a root starch converted to a solubility of about 3% to about 50% in water at 75° F., a viscosity within the range of about 15 seconds to about 400 seconds, as determined in the manner herein described and a dextrine content less than about 55%, as determined in the manner herein described, intimately dispersed with a soluble borate in effective amounts up to about 10% and about 3% to about 30% of a solvent plasticizer for said conversion product.

6. A remoistening tape of the character described comprising on at least one surface thereof a water pervious layer of adhesive consisting mainly of a root starch converted to a solubility of from about 3% to about 50% in water at 75° F., a viscosity within the range of about 15 seconds to about 400 seconds, as determined in the manner herein described, and a dextrine content less than about 55%, as determined in the manner herein described, intimately dispersed with a soluble borate in effective amounts up to about 10%, about 3% to about 30% of a normally solid plasticizer for said adhesive composition having a solvent action on said converstion product and about 1% to about 10% of a normally liquid plasticizer, said percentages being based upon the weight of the conversion product.

7. A remoistening tape of the character described comprising on at least one surface thereof a water pervious layer of adhesive consisting mainly of a root starch converted to a solubility of from about 3% to about 50% in water at 75° F., a viscosity within the range of about 15 seconds to about 400 seconds, as determined in the manner herein described, and a dextrine content less than about 55%, as determined in the manner herein described, intimately dispersed with about 1% to about 5% of a soluble borate and a solvent plasticizing agent for said conversion product in minimum amount of about 3%, said solvent plasticizing agent being effective in inhibiting the insolubilizing action of said borate on the conversion product.

8. A remoistening tape of the character described comprising on at least one surface thereof a water pervious layer of adhesive consisting mainly of a root starch conversion product converted to a solubility within the range of about 3% to about 50%, a viscosity within the range of about 15 seconds to about 400 seconds, as determined in the manner herein desscribed, and a dextrine content less than about 55%, intimately dispersed with a viscosity increasing agent in minimum amount of about 1% and a plasticizing agent in minimum amount of about 3%.

9. A remoistening tape of the character described comprising on at least one surface thereof a water pervious layer of adhesive formed from a root starch converted to a solubility of about 3% to about 50% in water at 75° F., a viscosity within the range of 15 seconds to 400 seconds, as determined in the manner herein described, and a dextrine content less than about 55%, as determined in the manner herein described, intimately dispersed with a viscosity increasing agent in effective amounts to increase the retack properties of said adhesive and a plasticizing agent in effective amounts to inhibit checks and cracks in dried films of said adhesive.

10. A remoistening tape of the character described comprising on at least one surface thereof a water-pervious layer of adhesive formed from a root starch converted to a solubility of about 3% to about 50% in water at 75° F., a viscosity within the range of about 15 seconds to about 400 seconds, as determined in the manner herein described, and a dextrine content less than about 55%, as determined in the manner herein described, intimately dispersed with a water-soluble urea in amounts from about 3% to about 30% by weight of said starch conversion product.

11. A remoistening tape of the character described comprising on at least one surface thereof a water-pervious layer of adhesive consisting mainly of a root starch converted to a solubility of about 3% to about 50% in water at 75° F., a viscosity within the range of about 15 seconds to about 400 seconds, as determined in the manner herein described, and a dextrine content less than about 55%, as determined in the manner herein described, intimately dispersed with a normally solid plasticizing agent having a solvent action on said root starch conversion product in amounts effective to produce an adhesive of strong re-tack properties and to inhibit cracking off of dried coatings of said adhesive.

12. A remoistening tape of the character described comprising on at least one surface thereof a layer of adhesive consisting mainly of an incompletely dextrinized amylaceous conversion product converted to a solubility of about 3% to about 50% in water at 75° F., a viscosity within the range of about 15 seconds to about 400 seconds, as determined in the manner herein described, and a dextrine content less than about 55%, as determined in the manner herein described, intimately dispersed with a plasticizing agent in effective amounts to produce an adhesive coating having strong re-tack properties and to inhibit cracking off of dried coatings of said adhesive.

HANS F. BAUER.
JORDAN V. BAUER.
DON M. HAWLEY.